(12) United States Patent
Puthiyedath et al.

(10) Patent No.: US 8,122,230 B2
(45) Date of Patent: Feb. 21, 2012

(54) USING A PROCESSOR IDENTIFICATION INSTRUCTION TO PROVIDE MULTI-LEVEL PROCESSOR TOPOLOGY INFORMATION

(75) Inventors: Leena K. Puthiyedath, Beaverton, OR (US); James B. Crossland, Banks, OR (US); Martin G. Dixon, Portland, OR (US); John G. Holm, Beaverton, OR (US); Raicsh Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/966,924

(22) Filed: Dec. 28, 2007

(65) Prior Publication Data
US 2009/0172357 A1 Jul. 2, 2009

(51) Int. Cl.
*G06F 9/30* (2006.01)
(52) U.S. Cl. .......................... 712/208; 712/1
(58) Field of Classification Search .................. None
See application file for complete search history.

(56) References Cited

U.S. PATENT DOCUMENTS

| 2004/0226026 A1* | 11/2004 | Glass et al. | 719/328 |
| 2008/0244221 A1* | 10/2008 | Newell et al. | 712/11 |
| 2009/0182979 A1* | 7/2009 | Farrell et al. | 712/200 |
| 2010/0312823 A1* | 12/2010 | Titus | 709/203 |

OTHER PUBLICATIONS

Carver (Processor and Core Enumeration Using CPUID) AMD Articles & Whitepapers, Jul. 9, 2009, pp. 5-7 (3 total pages).*
Nguyen et al. (Detecting Multi-Core Processor Topology in an IA-32 Platform); Intel Software Network; 2006; 17 pages.*
Intel Software Network Forums (How to find the number of processors); posts dated from Nov. 29 to Dec. 7, 2006; 7 total pages; accessed Feb. 1, 2010.*

* cited by examiner

*Primary Examiner* — Keith Vicary
(74) *Attorney, Agent, or Firm* — Thomas R. Lane

(57) ABSTRACT

Embodiments of an invention for using a processor identification instruction to provide multi-level processor topology information are disclosed. In one embodiment, a processor includes decode logic and control logic. The decode logic is to receive an identification instruction having an associated topological level value. The control logic is to provide, in response to the decode logic receiving the identification instruction, processor identification information corresponding to the associated topological level value.

20 Claims, 3 Drawing Sheets

METHOD 300

USING A PROCESSOR IDENTIFICATION INSTRUCTION TO PROVIDE MULTI-LEVEL PROCESSOR TOPOLOGY INFORMATION

BACKGROUND

1. Field

The present disclosure pertains to the field of information processing, and more particularly, to the field of multi-processor information processing systems.

2. Description of Related Art

Processors in a multi-processor information processing system may be arranged into groups. For example, a multi-processor system may include two or more clusters of processors, where each cluster includes multiple processors connected to each other on a processor bus. Other groupings of processors in a system are also possible. For example, a physical processor that supports simultaneous multi-threading ("SMT") may include a group of two or more logical processors, a multi-core processor may include a group of two or more processor cores, and a multi-chip package may include a group of two or more processor chips.

A system may include more than one type of grouping, so the processors may be arranged into different levels of groups. For example, two cores in one multi-core processor may each support SMT; therefore, there may be two groups of logical processors, with two logical processors per group, at one level, and one group of processor cores, with two processor cores per group, at another level. The arrangement of processors into different groups at different levels may be referred to as a multi-level processor topology.

Furthermore, each processor in a multi-processor system may support a processor identification instruction that may be used to uniquely identify the processors in the system.

BRIEF DESCRIPTION OF THE FIGURES

The present invention is illustrated by way of example and not limitation in the accompanying figures.

DETAILED DESCRIPTION

Embodiments of an invention for using a processor identification instruction to provide multi-level processor topology information are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

Advances in processor architecture and fabrication may continue to provide for more and more levels of processor topology, even within a single die or package. Therefore, embodiments of the present invention provide a means for software, such as an operating system ("OS"), to enumerate multi-level processor topology for many levels using a processor identification instruction. An embodiment of the present invention may be implemented presently on a processor in a manner that provides for the enumeration of presently undefined multi-level processor topologies on processors that may be developed in the future.

Figure 1:
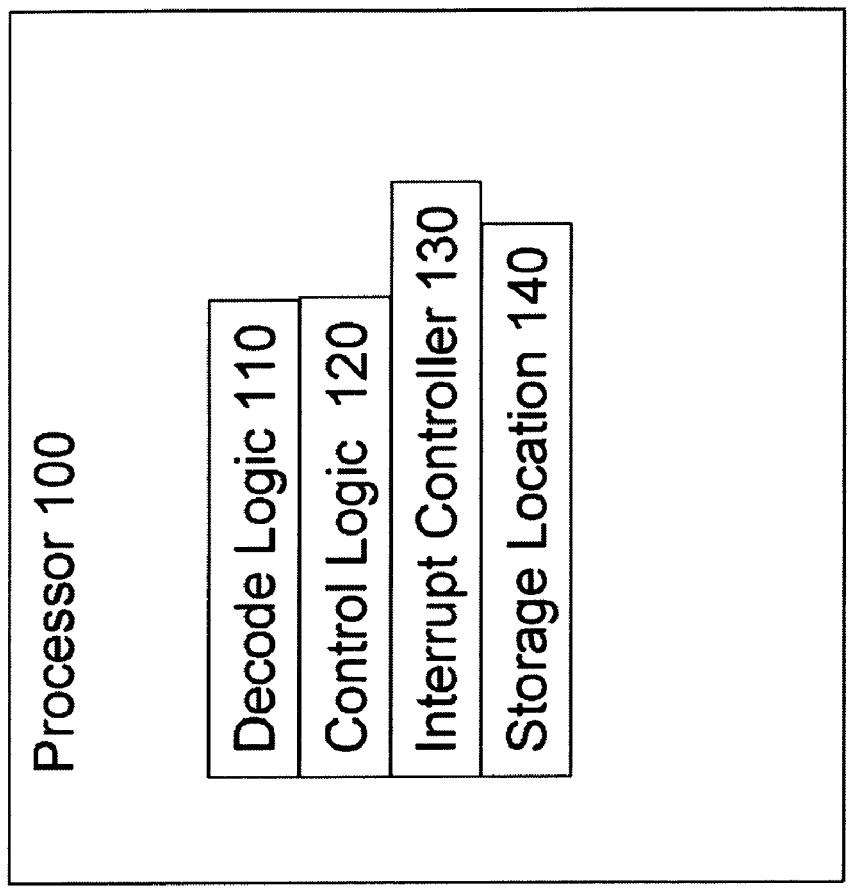
FIG. 1 illustrates a processor that supports an identification instruction according to an embodiment of the present invention.

FIG. 1 illustrates processor 100 according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 100 may represent one discrete processor, one logical processor in a multi-threaded processor or processor core, one core in a multi-core processor, one processor in a multi-chip package, or any other uniquely identifiable processing unit. Processor 100 includes decode logic 110, control logic 120, local interrupt controller 130, and storage location 140. Processor 100 may also include any other circuitry, structures, or logic not shown in FIG. 1.

Decode logic 110 is to receive an identification instruction. The identification instruction may be any instruction to which the processor is designed to respond with information to identify processor 100 or anything about processor 100. For example, the identification instruction may be a variation of the CPUID instruction in the instruction set architecture of the Intel® Pentium® Processor Family. An identification instruction according to the present invention has associated with it a topological level number. This topological level number, and various approaches to associating this topological level number with the identification instruction, will be described below. Decode logic 110 may be any circuitry or logic that recognizes, decodes, or otherwise receives the identification instruction.

Control logic 120 is to respond to the identification instruction by providing information about processor 100. In particular, this information includes information corresponding to the topological level number associated with the identification instruction. For example, a first topological level number may correspond to the topological level of the logical processors in an SMT environment, and a second topological level number may correspond to the topological level of the cores in a multi-core environment. Therefore, the information provided by control logic 120 when the first topological level number is associated with the identification instruction will relate to the identity of a logical processor, and the information provided by control logic 120 when the second topological level number is associated with the identification instruction will relate to the identity of a core. Control logic may be any circuitry or logic, including microcode, which causes processor 120 to provide the identification information.

Local interrupt controller 130 is to receive, generate, prioritize, deliver, hold pending, or otherwise control or manage interrupt messages directed to processor 100. Local interrupt controller 130 may include any circuitry or logic compatible with processor 100, for example, local interrupt controller 140 may be a local Advanced Programmable Interrupt Controller according to the architecture of the Intel® Pentium® Processor Family, including any extensions ("APIC"). Local interrupt controller 130 may include registers or other storage to provide for programmability.

Storage location 140 is to store the identification information, the topological level value, and/or any other information or parameters that may be useful to implement embodiments of the invention. Storage location 140 may include any type of memory accessible by processor 100, such as registers or arrays of read-only or read-writable memory, or any combination of different types of memory. In FIG. 1, storage location 140 may represent multiple storage locations that may be physically separated within processor 100, such as a number of general purpose processor registers, a number of model specific registers, a number of programmable or other registers for local interrupt controller 130, and a number of machine state storage locations.

In one embodiment, where processor 100 is a processor in the Intel® Pentium® Processor Family, the identification instruction may be the CPUID instruction, storage location 140 may include the processor's EAX, EBX, ECX, and EDX registers, and local interrupt controller 130 may be a local APIC.

In this embodiment, the CPUID instruction may be modified to support a new request type that returns topological identification information. For example, the request type may be identified by the value '0Bh' (where the 'h' refers to hexadecimal notation). Software may preload the EAX register with '0Bh' before issuing the CPUID instruction to cause the processor to return topological identification information.

In one embodiment, the topological level number may be an eight bit value and may be associated with the identification instruction by preloading it into the lower eight bits of the ECX register before issuing the CPUID instruction. In other embodiments, the topological level number may be of a different size and/or format, and may be associated with an instruction according to any other known approach, such as being associated with an instruction as a direct or an indirect operand.

In one embodiment, the value '00h' may be used as the topological level number for the SMT level. In this or other embodiments, each incrementally higher level number may indicate an incrementally higher topological level. To describe by example, FIG. 2 sets forth one possible hierarchy of topological levels to which an embodiment of the invention may be applied. Embodiments of the invention may also be applied to any other presently known or presently unknown hierarchy of any number of presently known or unknown topological levels.

Figure 2:
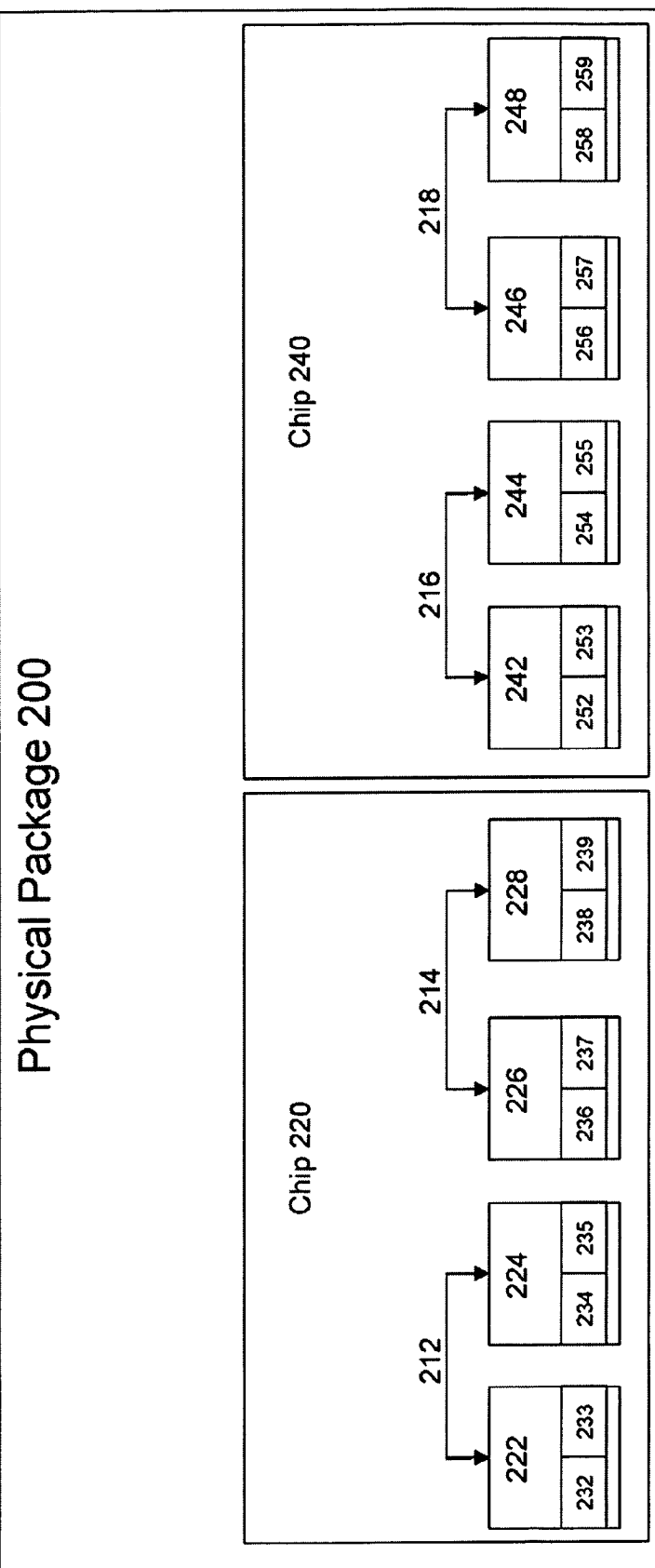
FIG. 2 illustrates a processor topology to which an embodiment of the present invention may be applied.

In FIG. 2, physical package 200 includes two chips 220 and 240, chip 220 having four cores 222, 224, 226, and 228, and chip 240 having four cores 242, 244, 246, and 248. All of the cores support SMT, illustrated as logical processors 232 and 233 in core 222, logical processors 234 and 235 in core 224, logical processors 236 and 237 in core 226, logical processors 238 and 239 in core 228, logical processors 252 and 253 in core 242, logical processors 254 and 255 in core 244, logical processors 256 and 257 in core 246, and logical processors 258 and 259 in core 248. Furthermore, within chip 220, cores 222 and 224 are coupled together by internal connector 212 and cores 226 and 228 are coupled together by Internal connector 214, and within chip 240, cores 242 and 244 are coupled together by internal connector 216 and cores 246 and 248 are coupled together by internal connector 218, thus forming two pairs of cores within each chip. These internal connectors may be busses or any other type of connection made for the purpose of sharing a cache or any other resource, or for any other purpose.

Therefore, FIG. 2 illustrates four topological levels, which may be distinguished using topological level numbers as follows. At topological level number '00h' are the sixteen logical processors. At topological level number '01h' are the eight cores. At topological level number '02h' are the four pairs of cores. At topological level number '03h' are the two chips.

Thus, in this embodiment, the decode logic 110 for one of the sixteen logical processors in FIG. 2 may receive the CPUID instruction with '0Bh' in the EAX register and '00h' in the ECX register, to indicate that topological identification information corresponding to the SMT level is desired. In response, the control logic 120 for that logical processor may provide its logical processor identification information, as described below. Then, software may iteratively issue the CPUID instruction, incrementing the topological level value before each iteration, to enumerate the processor topology. For example, decode logic 110 for the same logical processor may next receive the CPUID instruction with '0Bh' in the EAX register and '01h' in the ECX register, to indicate that topological identification information corresponding to the core level is desired. In response, the control logic 120 for that logical processor may provide its core identification information, as described below, and so on. To facilitate finding the end of this iterative process, control logic 120 may be designed to return a specific value, e.g., '00h' in EAX and '00h' in EBX, to indicate that the requested level is higher than the highest level in topology being enumerated. The identification instruction may also be issued individually for any level, or in sequence in any order, or in any combination of these ways.

The topological processor identification information provided by control logic 120 may include an identification number, a level number, a level type, a mask, and a processor count. This information may be provided by control logic 120 causing it to be generated, e.g., by reading it from a register or other location with storage location 140, and returned, e.g., by writing it to another register or other storage location within storage location 140. For example, the identification number may be the identification number ("ID") of the local interrupt controller 130, which may be stored in a local APIC identification register in storage location 140, or elsewhere, by basic input/output system software, other system configuration software, or other software. To execute the CPUID instruction, control logic 120 may cause this local APIC ID to be read from the local APIC ID register and stored in the EDX register, where it may be read by the software enumerating the topology. The identification number may be any number of bits, for example it may be an eight bit value according to the original APIC architecture, or a longer value (up to 32 bits if returned in the EDX register) according to an extension of the original APIC architecture.

The other information may be provided in a similar manner. The level number may be the same level number that was received in bits 7:0 of the ECX register, and may be returned in the same location. The level type may be an encoded value that represents some description of the topological level for which the information is being reported. For example, the value '01h' may be the encoded value that means SMT level type, the value '02h' may be the encoded value that means core level type, etc. The level type may be returned in bits 15:8 of the ECX register.

The mask may be a value that may be used to identify all other processors within the same group as the processor executing the CPUID instruction. The group may be any group definable within a level, for example, a group at the SMT level may be all the logical processors within one physical processor, a group at the core level may be all the cores within one multi-core processor, etc. The mask may be a value that specifies how many bits to shift the local APIC ID of each processor to arrive at a unique value for each group. For example, the local APIC IDs for two logical processors within one physical processor may be identical, except that the rightmost bit of one is a zero and the rightmost bit of the other is a one. In that case the mask value would be one, to indicate that the local APIC IDs for these processors may be shifted to the right by one bit to find a value shared by only these two logical processors that indicates that these two logical processors are in the same group. The mask may be returned in bits 4:0 of the EAX register.

The processor count may be returned in bits 15:0 of the EBX register to indicate the number of processors that are enabled in within a group. For example, for a given logical processor, the mask value may be two, to indicate that the APIC ID may be shifted two bits to the right to find all logical processors in the same group. Therefore, it may be possible for there to be four logical processors in that group (i.e., with APIC IDs ending in '00h', '01h', '10h', and '11h'). However, there may actually be only three processors enabled within this group, so the value for the processor count would be three. The number of enabled processors within a group may be less than the maximum possible number of processors in a group as indicated by the mask value, because there may not actually be the maximum possible number of processors available to be enabled within that group, or because one or more of the processors that might otherwise be in that group are disabled.

The processor identification information may be of any other size, may be returned in any other manner, and may include any other information within the scope of the present invention. Storage location 140 may include any number of storage locations of any size to store the information for each level (e.g., level type, mask for that level, and processor count at that level) within a processor, so that it may be written to the processor by BIOS or other configuration software, and be available to control logic 120 to respond to the identification instruction. Other approaches to returning the information may include writing it to different registers than those mentioned above, or writing it to designated memory locations.

Figure 3:
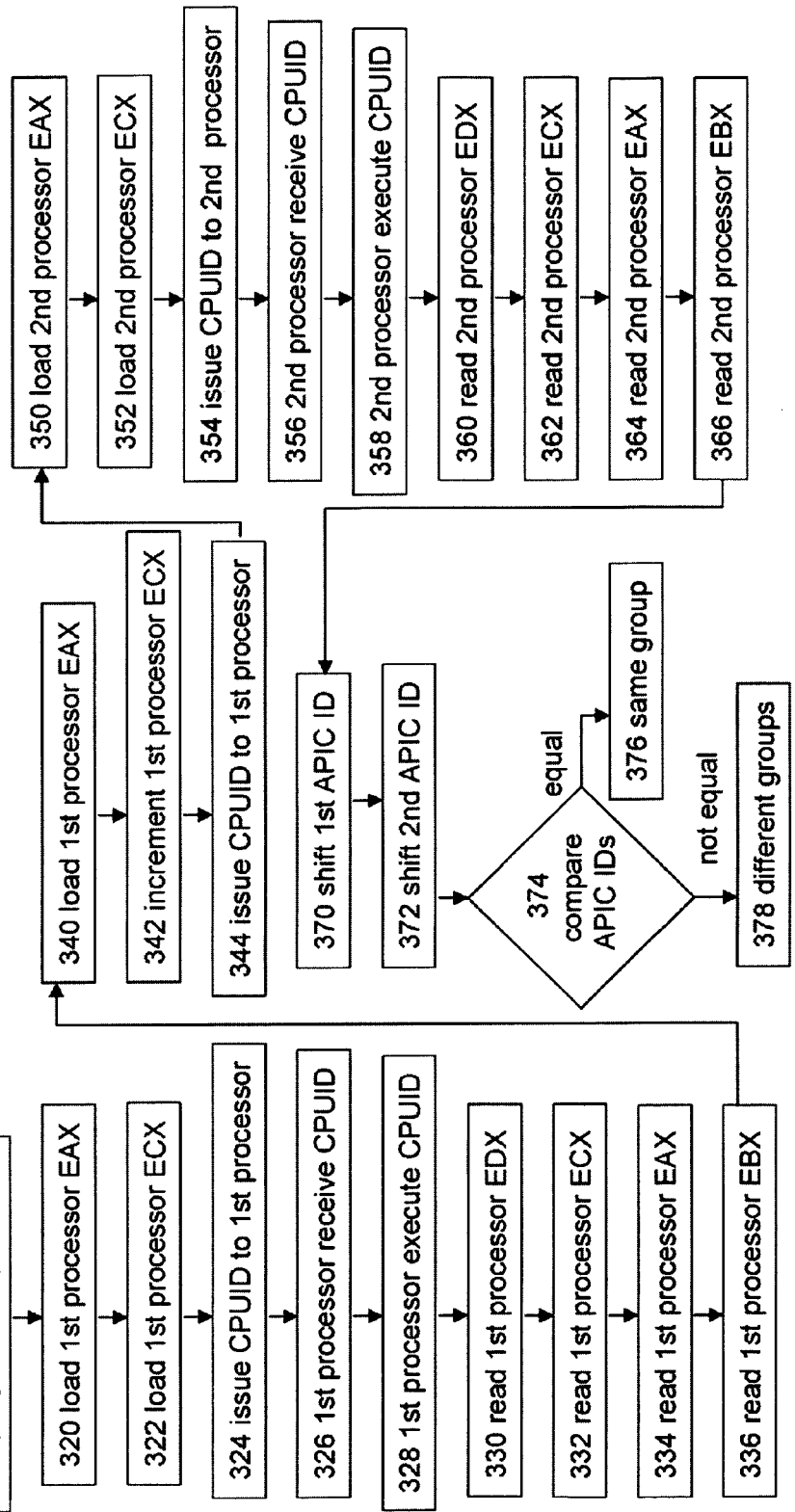
FIG. 3 illustrates a method for using a processor identification instruction according to an embodiment of the present invention.

FIG. 3 illustrates a method 300 for using a processor identification instruction according to an embodiment of the present invention. Although method embodiments of the invention are not limited in this respect, reference may be made to elements of processor 100 of FIG. 1 to describe the method embodiment of FIG. 3.

In box 310 of method 300, a first logical processor is assigned a first local APIC ID by BIOS programming the local APIC ID register corresponding to that logical processor with a first ID value. In box 312, a second logical processor in the same physical processor is assigned a second local APIC ID by BIOS programming the local APIC ID register corresponding to that logical processor with a second ID value. In this case, the first and second logical processors are the only logical processors supported by this physical processor, so their local APIC IDs are identical, except that the last bit of the first one is a zero and the last bit of the second one is a one.

In box 314, the first logical processor is configured with the appropriate identification information for each level of the topology, for example, in a storage location within the processor corresponding to level number '00h', the level type '01h' for SMT is stored, the mask '01h' for shifting the local APIC ID one bit to the right is stored, and the processor count '02h' for two logical processors is stored. In box 316, the second logical processor is configured with the appropriate identification information.

In box 320, OS software prepares to enumerate the topology for a package including the physical processor supporting the first and second logical processors by loading '0Bh' into the EAX register of the first logical processor. In box 322, OS software loads '00h' into the ECX register of the first logical processor. In box 324, OS software issues the CPUID instruction to the first logical processor.

In box 326, decode logic 110 in the first logical processor receives the CPUID instruction. In box 328, control logic 120 in the first logical processor responds to the CPUID instruction by loading its local APIC ID into its EDX register, loading level type '00h' into bits 15:8 of its ECX register, loading mask '01h' into bits 4:0 of its EAX register, and loading processor count '02h' into bits 15:0 of its EBX register.

In box 330, OS software reads the EDX register of the first logical processor to determine its local APIC ID. In box 332, OS software reads the ECX register of the first logical processor to confirm that the information is for level '00h' and to determine that the level type is SMT. In box 334, OS software reads the EAX register of the first logical processor to determine that the mask is '01h', which tells the OS software that the local APIC ID may be shifted one bit to the right to determine a unique ID for all processors in the same SMT-level group as the first logical processor. In box 336, OS software reads the EBX register of the first logical processor to determine that there are two logical processors in this group.

In box 340, OS software loads '0Bh' into the EAX register of the first logical processor. In box 342, OS software increments the ECX register of the first logical processor. In box 344, OS software issues the CPUID instruction to the first logical processor to continue to determine the identification information for the first logical processor for each level in the topology.

In box 350, OS software loads '0Bh' into the EAX register of the second logical processor. In box 352, OS software loads '00h' into the ECX register of the second logical processor. In box 354, OS software issues the CPUID instruction to the second logical processor.

In box 356, decode logic 110 in the second logical processor receives the CPUID instruction. In box 358, control logic 120 in the second logical processor responds to the CPUID instruction by loading its local APIC ID into its EDX register, loading level type '00h' into bits 15:8 of its ECX register, loading mask '01h' into bits 4:0 of its EAX register, and loading processor count '02h' into bits 15:0 of its EBX register In box 360, OS software reads the EDX register of the second logical processor to determine its local APIC ID. In box 362, OS software reads the ECX register of the second logical processor to confirm that the information is for level '00h' and to determine that the level type is SMT. In box 364, OS software reads the EAX register of the second logical processor to determine that the mask is '01h', which tells the OS software that the local APIC ID may be shifted one bit to the right to determine a unique ID for all processors in the same SMT-level group as the second logical processor. In box 366, OS software reads the EBX register of the second logical processor to determine that there are two logical processors in this group.

In box 370, OS software shifts the local APIC ID of the first logical processor, found in box 330, one bit to the right. In box 372, OS software shifts the local APIC ID of the second logical processor, found in box 350, one bit to the right. In box 374, OS software compares the results from box 370 and box 372 to determine, in box 376, that the shifted APIC IDs are equal, so the first and second logical processor are in the same SMT-level group. If instead, the two shifted APIC IDs were not equal, then, in box 378, it would be determined that the two processors were not in the same group as each other.

OS software may continue to execute the CPUID instruction for each level on all the logical processors in the package. Within the scope of the present invention, the method illustrated in FIG. 3 may be performed in a different order, with illustrated boxes omitted, with additional boxes added, or with a combination of reordered, omitted, or additional boxes. For example, boxes 370, 372, and 374 may be combined into one operation where the local APIC ID of the first logical processor is compared to the local APIC ID of the second logical processor with the rightmost bit masked.

Processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for using a processor identification instruction to provide multi-level processor topology information have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    hardware decode logic to receive an identification instruction having an associated topological level number; and
    control logic to provide, in response to the hardware decode logic receiving the identification instruction, processor identification information, including a level type value, wherein a first encoding of the level type value means logical processor level type, a second encoding of the level type value means core level type, and a third encoding of the level type value means chip level type, corresponding to the associated topological level number.

2. The processor of claim 1, further comprising an interrupt controller.

3. The processor of claim 2, wherein the processor identification information includes an identifier of the interrupt controller.

4. The processor of claim 3, wherein the processor identification information also includes mask information to specify a portion of the interrupt controller identifier to use to identify all processors within a group at a topological level specified by the topological level number.

5. The processor of claim 4, wherein the processor identification information also includes count information to indicate a number of enabled processors within the group.

6. The processor of claim 5, further comprising a count storage location to store the count information.

7. The processor of claim 4, further comprising a mask storage location to store the mask information.

8. The processor of claim 3, further comprising an interrupt controller identifier storage location to store the interrupt controller identifier.

9. The processor of claim 1, further comprising a request type storage location to store one of a plurality of request types, and the control logic is to provide the processor identification information in response to the decode logic receiving the identification instruction when the request type storage location is storing the one of a plurality of request types.

10. A method comprising:
    receiving an identification instruction having an associated topological level number; and
    providing, in response to a decoder receiving the identification instruction, processor identification information, including a level type value, wherein a first encoding of the level type value means logical processor level type, a second encoding of the level type value means core level type, and a third encoding of the level type value chip level type, corresponding to the associated topological level number.

11. The method of claim 10, wherein providing the processor identification information includes providing an interrupt controller identifier.

12. The method of claim 11, wherein providing the processor identification information also includes providing mask information to specify a portion of the interrupt controller identifier to use to identify all processors within a group at a topological level specified by the topological level number.

13. The method of claim 12, wherein providing the processor identification information also includes providing count information to indicate a number of enabled processors within the group.

14. The method of claim 12, further comprising comparing a portion of the interrupt controller identifier for a first processor to a portion of the interrupt controller identifier for a second processor using the mask information.

15. The method of claim 10, further comprising storing the processor identification information in a processor before receiving the identification instruction by the processor.

16. The method of claim 15, wherein storing the processor identification information in the processor includes programming an interrupt controller assigned to the processor with an interrupt controller identifier, and providing the processor identification information includes providing the interrupt controller identifier.

17. The method of claim 10, further comprising associating a request type with the identification instruction to request the processor identification information corresponding to the associated topological level number.

18. An apparatus comprising:
    a plurality of processors arranged in plurality of topological levels;

each of the processors including:
- hardware decode logic to receive an identification instruction having an associated topological level number; and
- control logic to provide, in response to the hardware decode logic receiving the identification instruction, processor identification information, including a level type value, wherein a first encoding of the level type value means logical processor level type, a second encoding of the level type value means core level type, and a third encoding of the level type value means chip level type, corresponding to the associated topological level number.

19. The apparatus of claim 18, wherein the plurality of processors includes a plurality of logical processors, and one of the plurality of topological levels includes the plurality of logical processors.

20. The apparatus of claim 19, wherein the plurality of logical processors are divided amongst a plurality of cores, and one of the plurality of topological levels includes the plurality of cores.

* * * * *